Feb. 20, 1962 — C W. MUSSER — 3,021,760
SHEET METAL NOZZLE
Filed Jan. 13, 1960

INVENTOR.
C WALTON MUSSER
BY
ATTORNEY

United States Patent Office 3,021,760
Patented Feb. 20, 1962

3,021,760
SHEET METAL NOZZLE
C Walton Musser, Beverly, Mass., assignor to the United States of America as represented by the Secretary of the Army
Filed Jan. 13, 1960, Ser. No. 2,314
1 Claim. (Cl. 89—1.7)
(Granted under Title 35, U.S. Code (1952), sec. 266)

The invention described herein may be manufactured and used by or for the Government for governmental purposes without the payment to me of any royalty thereon.

This invention relates to recoilless rifles, and more especially to a nozzle suitable for use with lightweight rifles which are adapted to be fired from the shoulder.

In order to meet the weight requirements of such a rifle, the nozzle is fabricated from a metal plate having kidney-shaped openings into which are fitted the ends of two sheet metal cones, a sheet metal insert being interposed between the opposed ends of these openings. A nozzle of this type has great utility in shoulder fired recoilless rifles for the reason that it is much lighter than a nozzle machined out of solid stock in the customary manner.

The invention will be better understood from the following description when considered in connection with the accompanying drawings and its scope is indicated by the appended claims.

Referring to the drawings.

Figure 1:
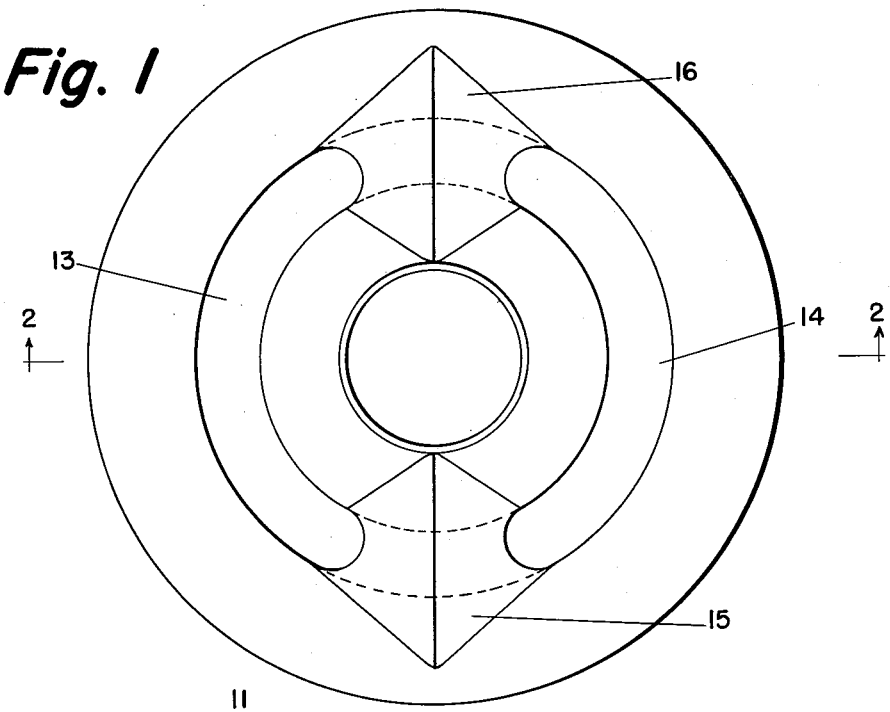
FIG. 1 illustrates the nozzle as viewed from the front.
Figure 2:
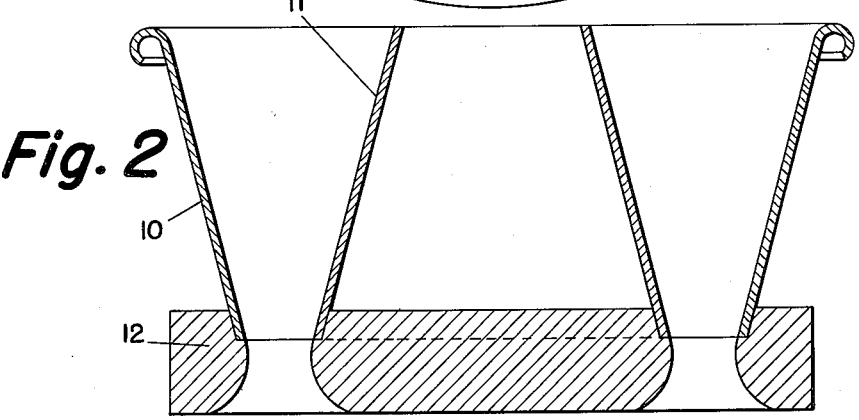
FIG. 2 is a sectional view taken on the line 2—2 of FIG. 1.
Figure 3:
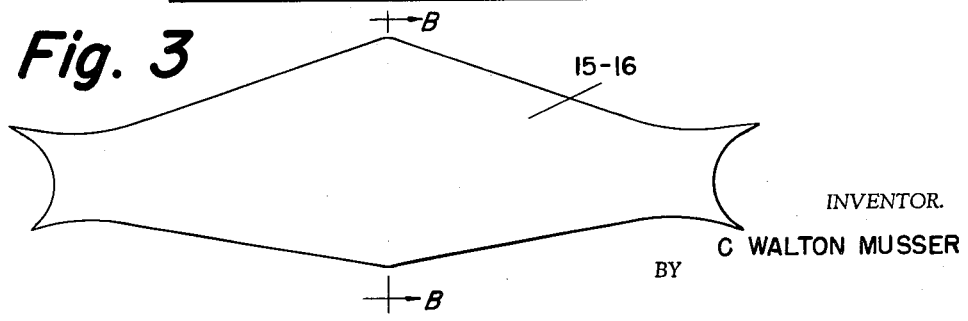
FIG. 3 shows the shape of the insert which is interposed between the opposed ends of the nozzle openings.

FIGS. 1 and 2 show a nozzle which includes an outer conical member 10, an inner conical member 11, and a metal plate 12 having two kidney-shaped openings 13 and 14. Between the opposed ends of these openings are interposed inserts 15 and 16.

As indicated by the broken lines, the plate 12 has a relief section into which the ends of the cones and the ends of the inserts fit. In the fabrication of the nozzle, the cones are welded or hydrogen brazed to the plate. The inserts are bent along the line B—B and formed at the ends so that they fit in between the cones and in the plate recess after which they are fastened to the cones and to the plate at the ends of the holes.

As will be readily understood, this results in a structure which is relatively light and strong.

I claim:

In a nozzle for use in a lightweight recoilless rifle, the combination of a plate having a plurality of kidney shaped openings in the form of a throat, an outer hollow sheet metal member circular in form and increasing in diameter from one end to the other, said outer hollow member having its small diameter end fixed to the outer sides of said openings, an inner hollow sheet metal member circular in form and decreasing in diameter from one end to the other, said inner hollow member having its large diameter end fixed to the inner sides of said openings, and a plurality of inserts, each of said inserts being arranged to extend along the outer slopes of said hollow members to the opposed ends of said openings.

References Cited in the file of this patent
UNITED STATES PATENTS

| | | |
|---|---|---|
| 2,480,328 | Johnston | Aug. 30, 1949 |
| 2,489,954 | Burney | Nov. 29, 1949 |
| 2,630,673 | Woll | Mar. 10, 1953 |

FOREIGN PATENTS

| | | |
|---|---|---|
| 468,583 | Great Britain | July 8, 1937 |